(12) United States Patent
Honda et al.

(10) Patent No.: US 8,810,860 B2
(45) Date of Patent: Aug. 19, 2014

(54) APPARATUS AND METHOD FOR FORMING IMAGE FOR PRINTING

(75) Inventors: Takashi Honda, Toyokawa (JP);
Takeshi Nomura, Toyohashi (JP);
Akihito Takada, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 328 days.

(21) Appl. No.: 12/841,520

(22) Filed: Jul. 22, 2010

(65) Prior Publication Data
US 2011/0019237 A1    Jan. 27, 2011

(30) Foreign Application Priority Data
Jul. 27, 2009 (JP) .................. 2009-174321

(51) Int. Cl.
*G06F 3/12* (2006.01)
*G06K 15/02* (2006.01)
*H04N 1/60* (2006.01)
*H04N 1/40* (2006.01)
*H04N 1/46* (2006.01)
*G03G 15/00* (2006.01)

(52) U.S. Cl.
USPC ........... 358/3.26; 358/1.15; 358/1.2; 358/1.9; 358/505; 399/38

(58) Field of Classification Search
USPC .................................... 358/1.2, 1.9
See application file for complete search history.

(56) References Cited

U.S. PATENT DOCUMENTS

| | | | |
|---|---|---|---|
| 6,816,623 B1 | 11/2004 | Maruta et al. | |
| 6,958,834 B1 * | 10/2005 | Ide ........................ | 358/505 |
| 7,266,315 B2 * | 9/2007 | Sato ........................ | 399/38 |
| 2002/0071132 A1 * | 6/2002 | Yamada et al. ........ | 358/1.9 |
| 2008/0266617 A1 * | 10/2008 | Suzuki .................. | 358/474 |
| 2009/0279108 A1 * | 11/2009 | Hoshi et al. .......... | 358/1.2 |

FOREIGN PATENT DOCUMENTS

| | | |
|---|---|---|
| JP | 11-17942 A | 1/1999 |
| JP | 11-355570 A | 12/1999 |
| JP | 2000-278497 A | 10/2000 |
| JP | 2002-101278 A | 4/2002 |
| JP | 2008-278277 A | 11/2008 |

OTHER PUBLICATIONS

Office Action from Japanese Patent Office issued in corresponding Japanese Patent Application No. 2009-174321 dated May 17, 2011, with an English translation thereof.

* cited by examiner

*Primary Examiner* — Marivelisse Santiago Cordero
*Assistant Examiner* — Temitayo Folayan
(74) *Attorney, Agent, or Firm* — Buchanan Ingersoll & Rooney PC

(57) ABSTRACT

An image forming apparatus comprises a image reader unit and a controller. The controller is configured to i) execute a detection operation of calculating a correction coefficient based on reference image data obtained by applying the light from a light source to a reference unit and receiving, by a photoelectric conversion unit, the reflected light from the reference unit to perform photoelectric conversion of the received light to the reference image data, ii) correct image density variations of the image data caused by orientation variations of the light source and pixel sensitivity of the photoelectric conversion unit based on the correction coefficient, iii) form an output image to be printed on output paper in accordance with an arrangement manner, based on the corrected image data, and iv) determine an interval at which the detection operation is executed, in accordance with a characteristic of the light source and the arrangement manner.

11 Claims, 12 Drawing Sheets

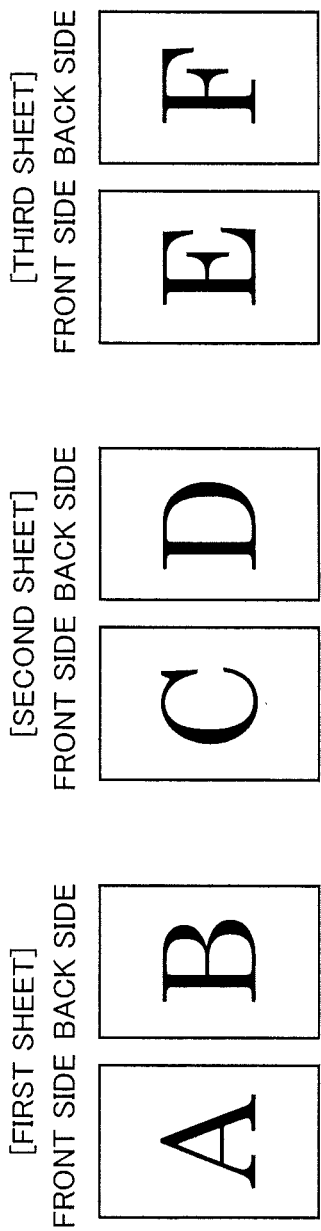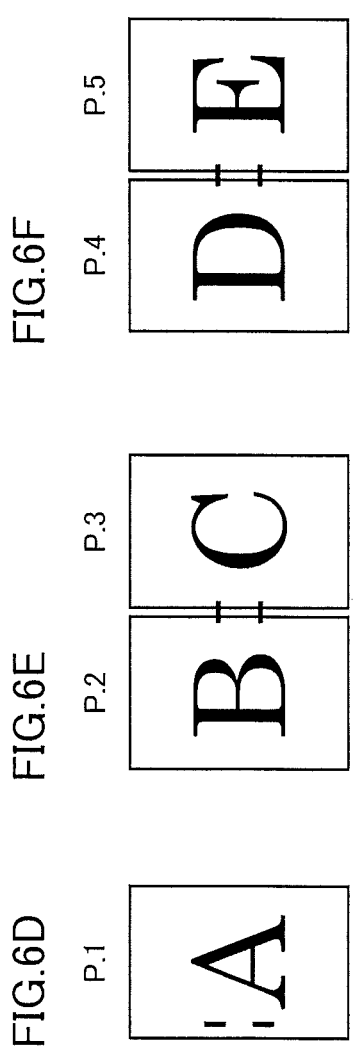

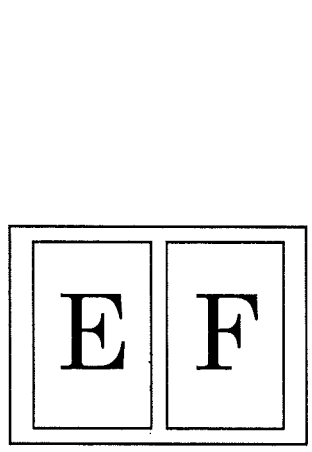
FIG.7A  FIG.7B  FIG.7C
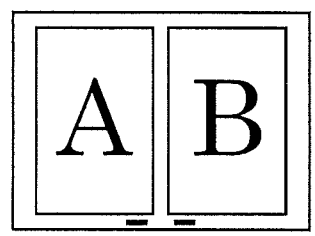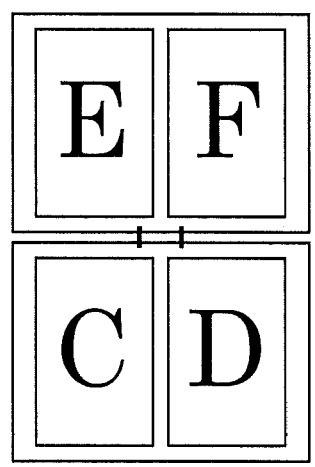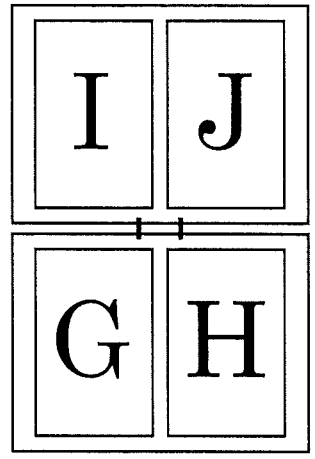
FIG.7D  FIG.7E  FIG.7F

| TB1:INTERRUPTION NO. | TB2:TIME (s) |
|---|---|
| 1 | 10 |
| 2 | 20 |
| 3 | 40 |
| 4 | 70 |
| 5 | 110 |
| 6 | 160 |
| 7 | 220 |
| 8 | 290 |
| ⋮ | ⋮ |
| ⋮ | ⋮ |

APPARATUS AND METHOD FOR FORMING IMAGE FOR PRINTING

This application is based on Japanese Patent Application No. 2009-174321 filed with the Japan Patent Office on Jul. 27, 2009, the entire content of which is hereby incorporated by reference.

BACKGROUND OF THE INVENTION

1. Field of the Invention

The present invention relates to an apparatus and a method for forming an image for printing, and more particularly to an apparatus and a method for forming image data to be printed on output paper, based on image data optically read from a document.

2. Description of the Related Art

In general, an ADF (Auto Document Feeder) in an image forming apparatus such as a copier feeds multiple documents placed on a document tray one by one into the apparatus and conveys the fed document to an image reading position. At the image reading position, an illumination unit applies light to the document. Reflected light from the document is subjected to photoelectric conversion, whereby image data is detected. The images of the documents successively fed by the conveyance are read in succession. In detecting the image data, shading correction is performed in which gray levels of pixels of the image data output from elements of the photoelectric conversion unit are made uniform.

When a CCFL (Cold Cathode Fluorescent Lamp), for example, is used as the illumination unit, it takes a long time for warm up to obtain the required quantity of emission light after the apparatus is powered on. This problem is noticeable particularly in a low-temperature environment. More specifically, the quantity of light applied from the illumination unit varies as the document reading operation continues, so that the density of the read image varies from document to document (gradually becomes lighter). This is because shading correction is usually performed only once before the start of execution of a job in a case where a plurality of documents are successively read by ADF.

Conventionally, in order to address the problem of image density variations, for example, a method is proposed by Japanese Laid-Open Patent Publication No. 11-17942. According to this method, at a time of document reading by ADF, shading correction is executed when a prescribed time has elapsed since CCD is turned on.

According to a method proposed by Japanese Laid-Open Patent Publication No. 11-355570, at a time of document reading by ADF, a timing at which shading correction is executed is changed during document reading, depending on a variety of states/settings of a scanner (the light source ON time, the quantity of emission light from a light source, the number of documents to be read).

According to a method proposed by Japanese Laid-Open Patent Publication No. 2000-278497, in a case where both sides of a document are read by ADF, shading correction is executed when the document is reversed in order to read the second side after reading of the first side is ended.

In the conventional methods as described above, shading correction is executed at a timing depending on a variety of states/settings of a scanner. In other words, shading correction is executed at such timing that ignores a manner of arranging images in a print product, which leads to the following problems.

For example, assuming that a printed product is in a booklet form, shading correction is executed while documents corresponding to a double-page spread of the booklet are read. In this case, the image of the document read before shading correction is present on the left side of the double-page spread while the image of the document read after shading correction is present on the right side of the double-page spread. As a result, a subtle difference in density/color tone arises between the images on the left side and the right side of the spread. On the other hand, with Page Layout Function in which a plurality of images read from multiple pages of documents are arranged on a surface of one sheet of output paper, a plurality of images are placed on a single output sheet of paper. Also in this case, shading correction is done between the start and the end of reading a plurality of images, so that a difference in density/color tone is caused between a plurality of images on the same sheet.

If an image density difference arises on the same sheet or between the spread pages, the difference is easily noticed and gives the users a sense of discomfort or displeasure.

It is therefore desired to provide an image forming apparatus that does not cause a density/color tone difference between the images on the left side and the right side of a double-page spread of a booklet and between a plurality of images on the same page, which are edited with printed output sheets.

SUMMARY OF THE INVENTION

An object of the present invention is to provide an apparatus and a method for forming an image, in which there is no density difference or color tone difference between images on the same sheet of output paper, irrespective of a manner of arrangement of images on output paper.

In order to achieve the aforementioned object, an image forming apparatus in accordance with an aspect of the present invention comprises an image reader unit for outputting image data of a document supplied through a conveyance path, and a controller. The image reader unit includes a light source for emitting light, and a photoelectric converter having pixels for receiving reflected light and performing photoelectric conversion of the reflected light. The image reader unit obtains the image data by applying the light from the light source to the document and performing photoelectric conversion of the reflected light from the document. The controller is configured to i) execute a detection operation of calculating a correction coefficient based on reference image data obtained by applying the light from the light source to a predetermined reference unit and receiving, by the photoelectric conversion unit, the reflected light from the predetermined reference unit to perform photoelectric conversion of the received light to the reference image data, ii) correct image density variations of the image data caused by orientation variations of the light source and pixel sensitivity of the photoelectric conversion unit based on the correction coefficient, iii) form an output image to be printed on output paper in accordance with a prescribed arrangement manner on the output paper, based on the corrected image data, and iv) determine an interval at which the detection operation is executed, in accordance with a characteristic of the light source and the prescribed arrangement manner.

Preferably, the image forming apparatus further includes a document conveyance unit for conveying a document placed on a document tray through a conveyance path.

Preferably, the characteristic of the light source refers to a relation between an elapsed time since the quantity of emission light from the light source reaches a level that allows image reading upon start of power supply to the image forming apparatus, and an exposure level depending on the quantity of emission light.

Preferably, the prescribed arrangement manner includes an N in 1 manner that designates N (N is an integer of one or more) pieces of the image data to be arranged on a plane of one sheet of the output paper.

Preferably, the prescribed arrangement manner includes a double-side manner that designates the image data to be arranged on each of both sides of the output paper.

Preferably, the prescribed arrangement manner includes a combination of an N in 1 manner that designates N (N is an integer of one or more) pieces of the image data to be arranged on a plane of one sheet of the output paper and a double-side manner that designates the image data to be arranged on each of both sides of the output paper.

Preferably, the controller determines an interval at which the detection operation is executed, by changing a prescribed interval in accordance with the prescribed arrangement manner. The prescribed interval is determined in advance based on a characteristic of the light source.

Preferably, the controller determines an interval at which the detection operation is executed based on the prescribed arrangement manner, within a period during which the prescribed interval is designated.

Preferably, the prescribed interval is changed based on an environmental condition in which the image forming apparatus is installed. Preferably, this environmental condition refers to an ambient temperature.

An image forming method in accordance with another aspect of the present invention includes the steps of: applying light from a light source to a supplied document, receiving reflected light from the document, performing photoelectric conversion to read and output image data of the document; applying light from the light source to a reference unit prepared beforehand, receiving reflected light from the reference unit, performing photoelectric conversion to read reference image data, and executing a detection operation of calculating a correction coefficient based on the reference image data; correcting image density of the image data caused by variations orientation variations of the light source and pixel sensitivity of the photoelectric conversion based on the correction coefficient; forming an output image to be printed on output paper in accordance with a prescribed arrangement manner on the output paper, based on corrected the image data; and determining an interval at which the detection operation is executed, in accordance with a characteristic of the light source and the prescribed arrangement manner.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6A-FIG. 6F show an output example of duplex printing in accordance with an embodiment of the present invention.

FIG. 7A-FIG. 7F show an output example of Page Layout Function (2 in 1) in accordance with an embodiment of the present invention.

DESCRIPTION OF THE PREFERRED EMBODIMENTS

Figure 1:
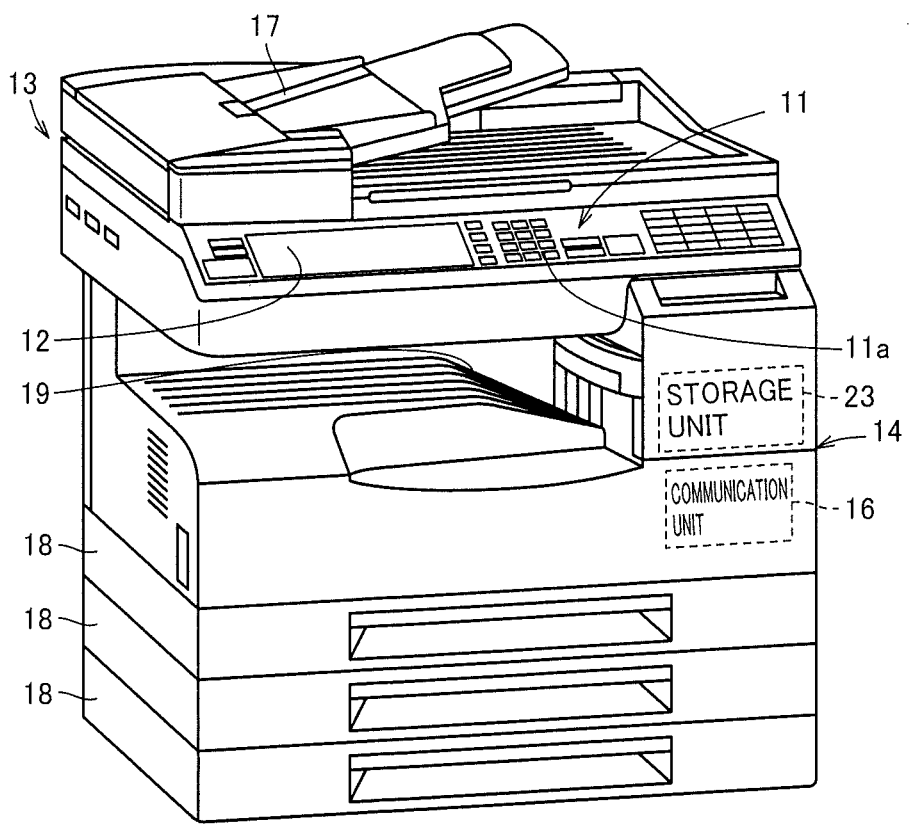
FIG. 1 is an external view of AIO (All In One) in accordance with an embodiment of the present invention.

In the following, an image forming apparatus in accordance with an embodiment of the present invention will be described with reference to the figures, in a case where it is mounted on a digital multifunction device (All In One (hereinafter abbreviated as AIO) having a copy function, a scanner function, a printer function, a facsimile function, and the like, by way of example. It is noted that the same or corresponding parts in the figures are denoted with the same reference numerals.

[Overview of Apparatus]

FIG. 1 shows an external view of an AIO in accordance with the present embodiment.

Referring to FIG. 1, AIO 1 includes an operation unit 11 including a plurality of keys 11a for accepting a variety of instructions and data such as characters and numbers input by the user operating keys 11a, a display unit 12 for displaying available instruction menus, information concerning images obtained (detected) by AIO 1, and the like to the user, a scanner unit 13 for optically reading documents and detecting image data, and a printer unit 14 for printing images on recording sheets, which are output paper, based on image data.

AIO 1 further includes an ADF unit 17 provided on the top of the apparatus body for automatically passing a document placed in advance to scanner unit 13, a paper feed unit 18 provided at the central portion of the apparatus body for supplying a recording sheet to printer unit 14, and a tray 19 provided at the central portion of the apparatus body for receiving the ejected recording sheet having an image printed by printer unit 14. AIO 1 further includes a communication unit 16 provided in the inside of the apparatus body for sending/receiving image data and the like to/from an external device via a network, and a storage unit 23 provided in the inside of the apparatus body for storing image data and the like. Although not shown here, AIO 1 has a network interface. Communication unit 16 is connected with a network through the network interface so that a variety of data can be sent/received to/from an external device.

Scanner unit 13 applies light to a document having an image such as a photograph, character, or picture formed thereon, receives reflected light from the document, and converts the received light signal into an electrical signal in accordance with the quantity of received light (which is referred to as photoelectric conversion). Scanner unit 13 outputs image data based on the electrical signal detected by photoelectric conversion. Accordingly, the image of the document is read, and image data is then detected. The detected image data is density data indicating gray levels pixel by pixel. The image data to be output is formed (generated) by performing a variety of well-known image processing on the image data in a not-shown image processing unit. The formed image data is sent to printer unit 14 or communication unit 16. Printer unit 14 prints an image on a recording sheet based on the received image data. Communication unit 16 modulates and converts the received image data into a signal and transmits the signal to the outside via a network. Alternatively, the formed image data is stored in storage unit 23 for later use.

Printer unit 14 prints an image on a recording sheet based on the image data detected by scanner unit 13, the image data received from an external device by communication unit 16, or the image data read from storage unit 23.

AIO 1 has a function of transmitting/receiving data through an external network. More specifically, communication unit 16 transmits/receives facsimile data through a public switched network and, in addition, transmits/receives data using emails and the like through a wide-area network such as a LAN (Local Area Network) and the Internet to/from an external device connected to the network.

Figure 2:
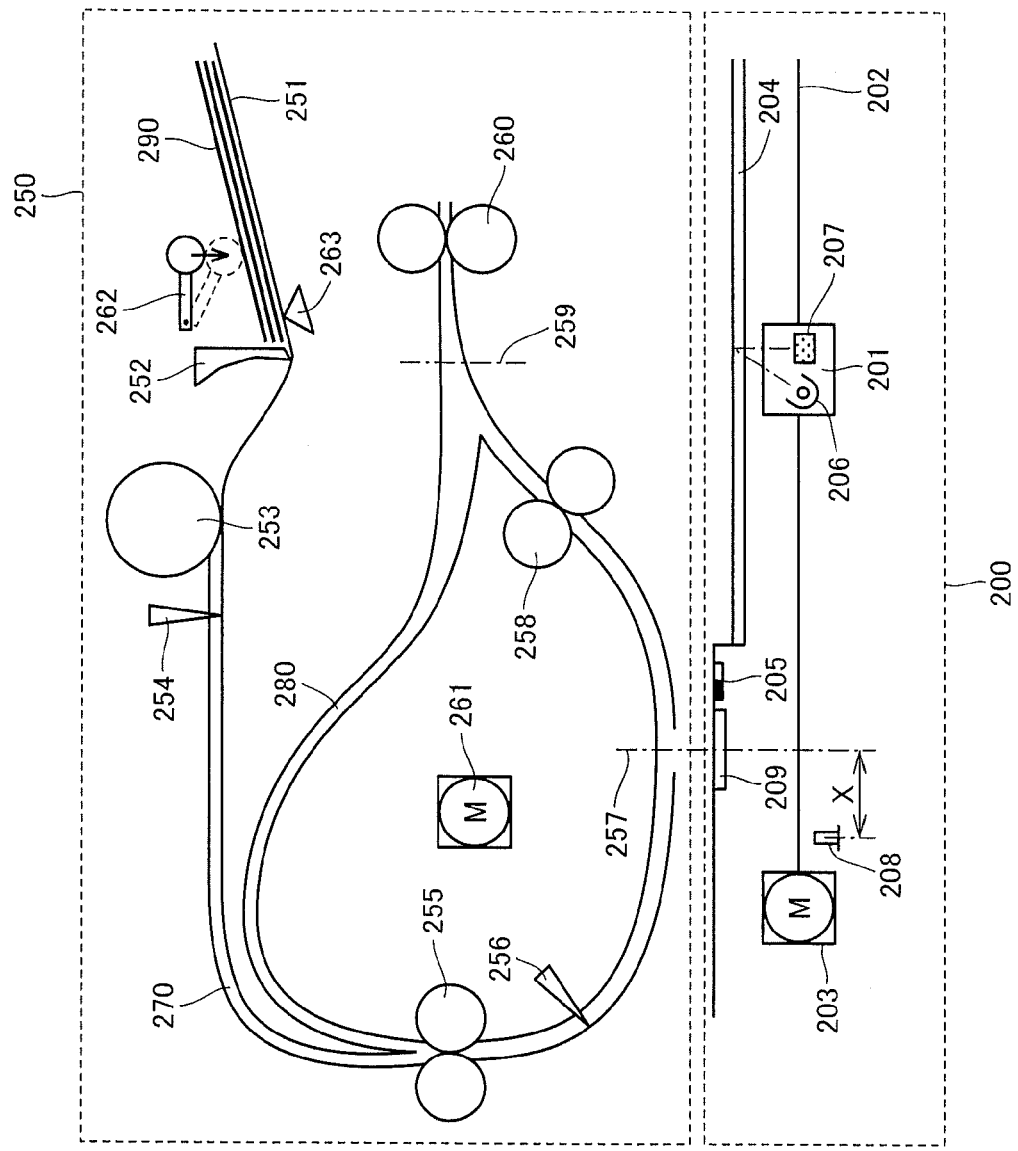
FIG. 2 is a hardware configuration diagram of an IR (Image Reader) unit and an ADF unit in accordance with an embodiment of the present invention.

Referring to FIG. 2, a hardware structure of an image reader (hereinafter abbreviated as IR) unit 200 for reading an image of a document and an ADF unit 250 for conveying a document to be supplied to IR unit 200 will be described.

IR unit 200 includes a transparent platen glass 204, and an IR module 201 positioned opposite to ADF unit 250 with platen glass 204 interposed. IR module 201 includes a lamp 206, for example, such as a fluorescent lamp, serving as a light source for applying light to a document, and an image sensor 207 corresponding to a photoelectric conversion unit. In operation, a document placed on the surface of platen glass 204 is scanned by IR module 201 positioned on the back side of platen glass 204. While scanning, IR module 201 applies light to platen glass 204 by lamp 206. The reflected light is received by image sensor 207, and image sensor 207 in turn outputs an electrical signal at a level in accordance with the quantity of received light. The electrical signal output as a result of this photoelectric conversion is detected as image data representing the image of the document.

IR unit 200 includes, as a mechanism for moving IR module 201 for scanning a document, an IR motor 203 and a drive transmission unit 202 such as a belt or a wire. Drive transmission unit 202 is connected to IR module 201 and motor 203 thereby transmitting a rotational operation of motor 203 to IR module 201. Accordingly, IR module 201 moves in connection with the rotation of motor 203 so that the document is scanned along platen glass 204.

In IR unit 200, a shading plate 205 is arranged at a prescribed location for detecting a reference white output for shading correction. In reading a document, IR module 201 moves to the prescribed location for shading correction. After moving, IR module 201 applies light to shading plate 205 set at the prescribed location. Accordingly, IR module 201 reads image data of shading plate 205 through the aforementioned photoelectric conversion. A shading correction process is executed for correcting pixel variations of image sensor 207, based on the read image data.

A home position sensor 208 is arranged at a prescribed location of IR unit 200. Home position sensor 208 is used to detect a reference location for positioning when IR module 201 performs scanning.

IR unit 200 includes an ADF reading glass (hereinafter referred to as glass 209) for reading the supplied document 290 conveyed by ADF unit 250. When document 290 is supplied to glass 209, the front surface of document 209 and the front surface of glass 209 are opposed to each other.

ADF unit 250 corresponding to ADF unit 17 feeds paper to IR unit 200 while conveying documents 290 placed on a document tray 251 one by one. When document 290 fed to IR unit 200 passes through glass 209, the image data of document 290 is detected by IR module 201. The configuration and operation of ADF unit 250 will be detailed later.

[Functional Configuration]

Figure 3:
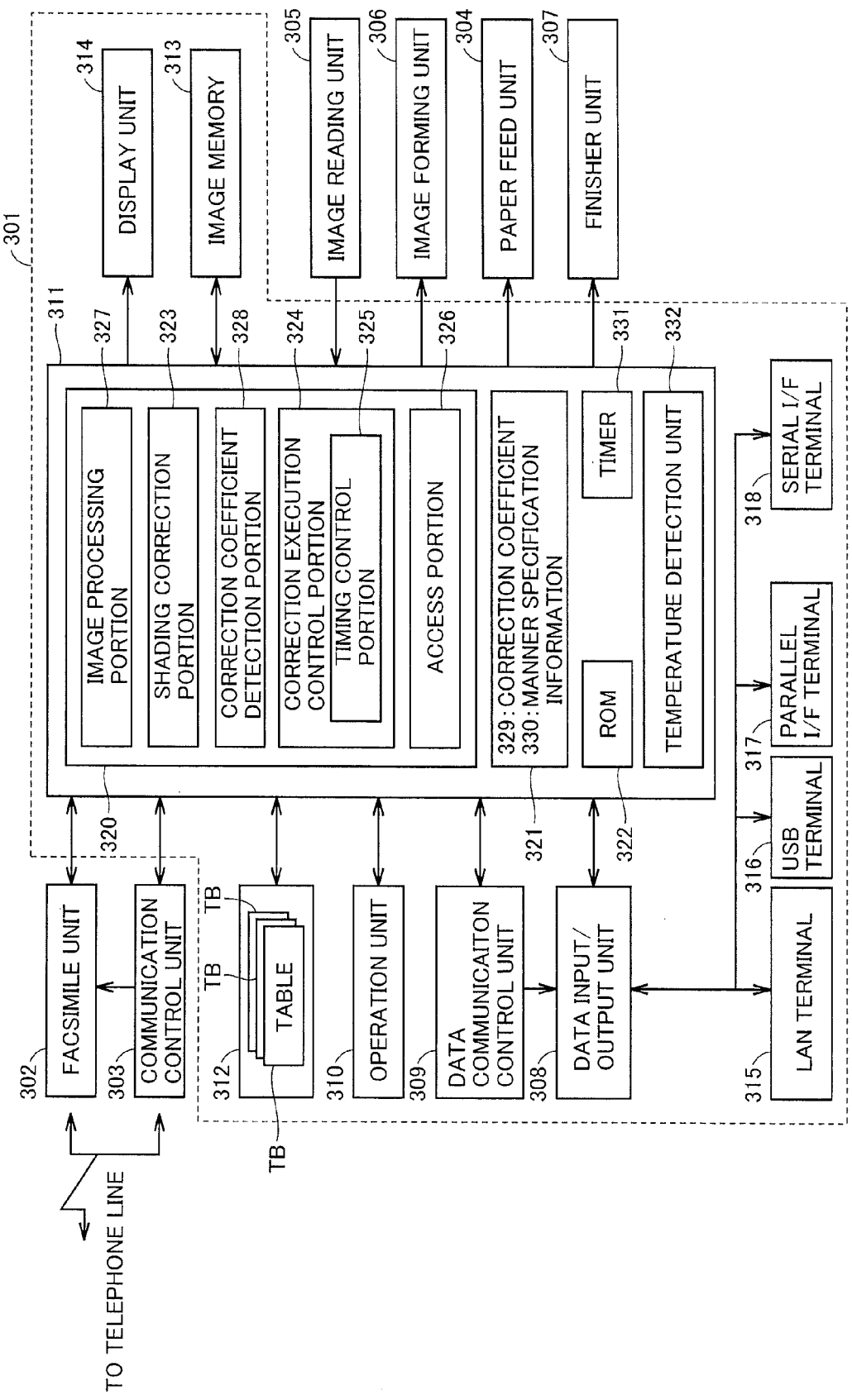
FIG. 3 is a functional configuration diagram of AIO in accordance with an embodiment of the present invention.

Referring to FIG. 3, AIO 1 includes an information processing unit 301, a facsimile unit 302 and a communication control unit 303 for facsimile communication through a telephone line, a paper feed unit 304 corresponding to ADF unit 250, an image reading unit 305 corresponding to IR unit 200, an image forming unit 306, and a finisher unit 307. Image forming unit 306 arranges image data in accordance with the specified output manner and prints the arranged image on a recording sheet. Finisher unit 307 is arranged downstream from image forming unit 306 and executes a variety of finishing processing on the recording sheet printed and output by image forming unit 306.

Information processing unit 301 includes a data input/output unit 308, a data communication control unit 309, an operation unit 310 corresponding to operation unit 11, a control device 311, a nonvolatile memory 312, an image memory 313, and a display unit 314. Information processing unit 301 further includes different kinds of interface terminals such as a LAN terminal 315 for a network in accordance with TCP/IP (Transmission Control Protocol/Internet Protocol), a USB (Universal Serial Bus) terminal 316, a parallel interface terminal 317, and a serial interface terminal 318, in connection with data input/output unit 308.

Information processing unit 301 is capable of control of deletion, output, etc. of a job stored in image memory 313.

Data input/output unit 308 is connected with control device 311. Data input/output unit 308 is used when control device 311 inputs/outputs a job from/to an external device through a variety of interface terminals as mentioned above.

Output from control device 311 are an operation instruction to the drive system including IR motor 203 for reading document 290 and an operation instruction to the drive system including ADF motor 261 for conveying documents by ADF unit 250. ADF unit 250 receives the operation instruction from control device 311 to supply document 290 to image reading unit 305 while conveying document 290. Image reading unit 305 reads the supplied document 290 and outputs image data detected by reading to control device 311.

Control device 311 includes a CPU (Central Processing Unit) 320, a RAM (Random Access Memory) 321, a ROM (Read Only Memory) 322, a timer 331, and a temperature detection unit 332. CPU 320 includes a correction coefficient detection portion 328, a correction execution control portion 324 for controlling execution of a correction coefficient detection (calculation) operation by correction coefficient detection portion 328, a shading correction portion 323, an access portion 326, and an image processing portion 327.

Shading correction portion 323 receives image data read by image reading unit 305 and executes shading correction on the input image data in accordance with a correction coefficient detected by correction coefficient detection portion 328.

Access portion 326 writes and reads data into/from image memory 313, RAM 321, ROM 322, and nonvolatile memory 312.

Correction execution control portion 324 includes a timing control portion 325 which determines a timing at which an operation of detecting the shading correction coefficient is to be executed thereby detecting the timing. When the present moment coincides with the timing at which interruptive shading (described later) is to be executed, timing control portion 325 outputs an execution instruction to correction coefficient detection portion 328 to calculate a correction coefficient.

Image processing portion 327 receives image data subjected to shading correction by shading correction portion 323 and performs well-known prescribed image processing such as MTF (Modulation Transfer Function) correction and masking correction on the received image data. The processed image data is output to image forming unit 306.

The functions of the portions in CPU 320 are partially implemented by program data. CPU 320 reads the program data from various memories through access portion 326 and executes the instructions of the read program. Accordingly, the function of each portion is implemented.

[Operation of ADF Unit and IR Unit]

Referring to FIG. 2, the configuration and the basic document delivery operation of ADF unit 250 will be described in relation with the operation of reading an image of a document by IR unit 200.

First, it is necessary to move IR module 201 immediately below an ADF reading position 257 in order to allow image sensor 207 to read an image of a document conveyed by ADF unit 250 and supplied to IR unit 200. ADF reading position 257 corresponds to the approximately central portion of that side of glass 209 which extends in the direction in which the document is conveyed. Here, a value of the distance X between ADF reading position 257 and home position sensor 208 is predetermined in designing AIO 1 and is stored in nonvolatile memory 312. Therefore, control device 311 generates an operation instruction based on the value of distance X read from nonvolatile memory 312 and outputs the read operation instruction to image reading unit 305.

Motor 203 of IR unit 200 corresponding to image reading unit 305 rotates in accordance with the direction and the rotational angle indicated by the operation instruction. In connection with this rotation, IR module 201 once moves, through drive transmission unit 202, to the location of home position sensor 208, then moves from home position sensor 208 by distance X, and stops at the position after moving. Accordingly, IR module 201 can be arranged immediately below ADF reading position 257.

ADF unit 250 includes an ADF motor 261 for rotating each roller, a document tray 251 on which documents 290 to be printed are placed, and a control unit for delivering documents 290 one by one from document tray 251 to a conveyance path. This control unit includes a pick-up roller 262, a document detection sensor 263, and a document stopper 252.

ADF unit 250 further includes, on the document conveyance path, conveyance paths 270 and 280, a paper feed roller 253, a conveyance roller 255, a paper feed sensor 254, and a registration sensor 256, for supplying document 290 to glass 209. ADF unit 250 further includes a paper exit roller 258 and a paper exit roller 260 positioned on an exit path for discharging document 290 from which an image has been read, to the outside. ADF unit 250 further includes a switch back position 259 for reading the both sides (surfaces) of document 290. Switch back position 259 receives document 290 that has passed through conveyance path 270 and from which an image on one side has been read at glass 209, and then reverses and supplies the document 290 to glass 209 again to allow an image on the other side to be read.

In operation, document detection sensor 263 senses whether document 290 is placed on document tray 251 or not. Delivery of document 290 by ADF is executed only when document detection sensor 263 detects that a document exists, at a time of execution of image reading of document 290.

If it is sensed that a document exists, control device 311 outputs an operation instruction to ADF motor 261 to drive ADF motor 261. When ADF motor 261 is driven, the motive power of ADF motor 261 is transmitted to each roller by a not-shown gear and the like, resulting in that each roller starts rotating. In delivery of document 290, first, control device 311 brings pick-up roller 262, which is not in contact with document 290, into contact with the document surface thereby delivering document 290 to the inside of ADF unit 250 through document stopper 252. Pick-up roller 262 has its operation switched by a not-shown electromagnetic clutch and the like.

In a case where an image on only one side of document 290 is read, the document delivered to the inside of ADF unit 250 by pick-up roller 262 is conveyed from paper-feed roller 253 to conveyance roller 255 through conveyance path 270. Thereafter, the edge of document 290 reaches registration sensor 256, so that an output signal of registration sensor 256 is changed. The output signal of registration sensor 256 is output to control device 311. Here, the distance between the position at which registration sensor 256 is set and ADF reading position 257 is predetermined as a design matter, and the determined distance is stored in nonvolatile memory 312. The conveyance speed of document 290 is also predetermined as a design matter, and the determined value is stored in nonvolatile memory 312. Therefore, control device 311 can detect a prescribed time taken for document 290 to pass from the position at which registration sensor 256 is set, to ADF reading position 257, based on the data of the distance and the conveyance speed read from nonvolatile memory 312. Control device 311 controls image sensor 207 such that image reading is started after the prescribed time has passed since a change of the output signal of registration sensor 256 was detected. Accordingly, image sensor 207 can detect an image of document 290 conveyed by ADF unit 250. Thereafter, document 290 is conveyed by paper exit roller 258 and paper exit roller 260 and discharged from the inside of ADF unit 250 to the outside.

On the other hand, in a case where images on both sides of document 290 are read, after the image on one side is read by image sensor 207 as described above, the back edge of document 290 reaches switchback position 259. The reaching is sensed by a sensor or the like, and control device 311 then controls ADF motor 261 such that it temporarily stops, based on the sense signal. Thereafter, ADF motor 261 is controlled to rotate in the reverse direction. As a result, document 290 is conveyed through conveyance path 280 and moved to the position of conveyance roller 255. Here, control device 311 controls ADF motor 261 such that it temporarily stops again, and returns the rotational direction of ADF motor 261 to the forward rotation. Then, control device 311 controls ADF motor 261 such that it starts rotation. Accordingly, document 290 is conveyed to ADF reading position 257 so that an image on the other side of document 290 is read.

An operation of reading images of documents 290 by IR unit 200 while successively conveying a plurality of documents 290 by ADF unit 250 will now be described.

In order to reduce the density variations in the read image for each of a plurality of documents 290, detection of a shading correction coefficient is executed between after reading of the image of document 290 and before the start of reading of the image of the next document 290. The detection of a shading correction coefficient at such a timing is referred to as "interruptive shading" hereinafter.

Figure 4:
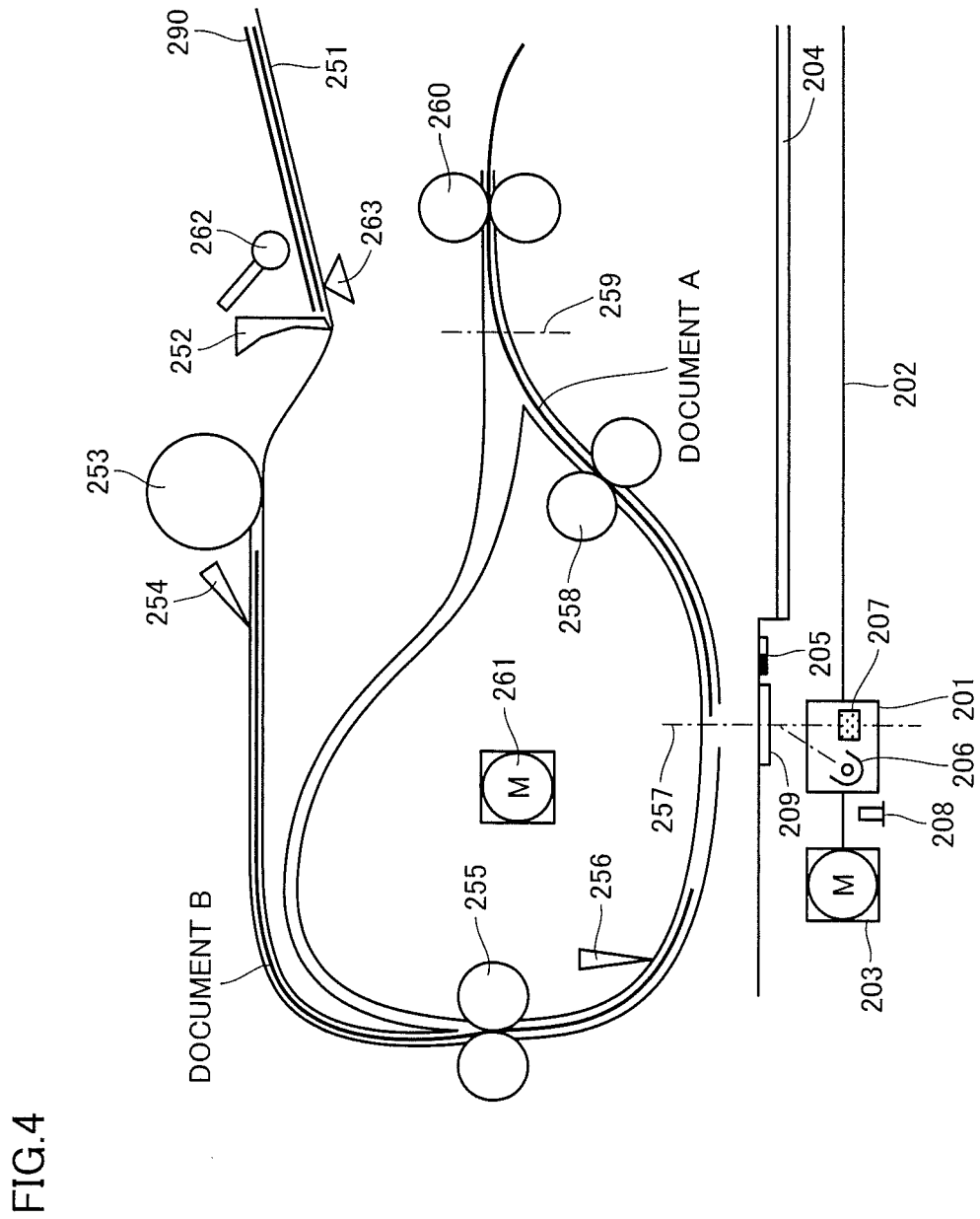
FIG. 4 illustrates a scanner operation (ADF delivery stop/resumption) at a time of interruptive shading in accordance with an embodiment of the present invention.
Figure 5:
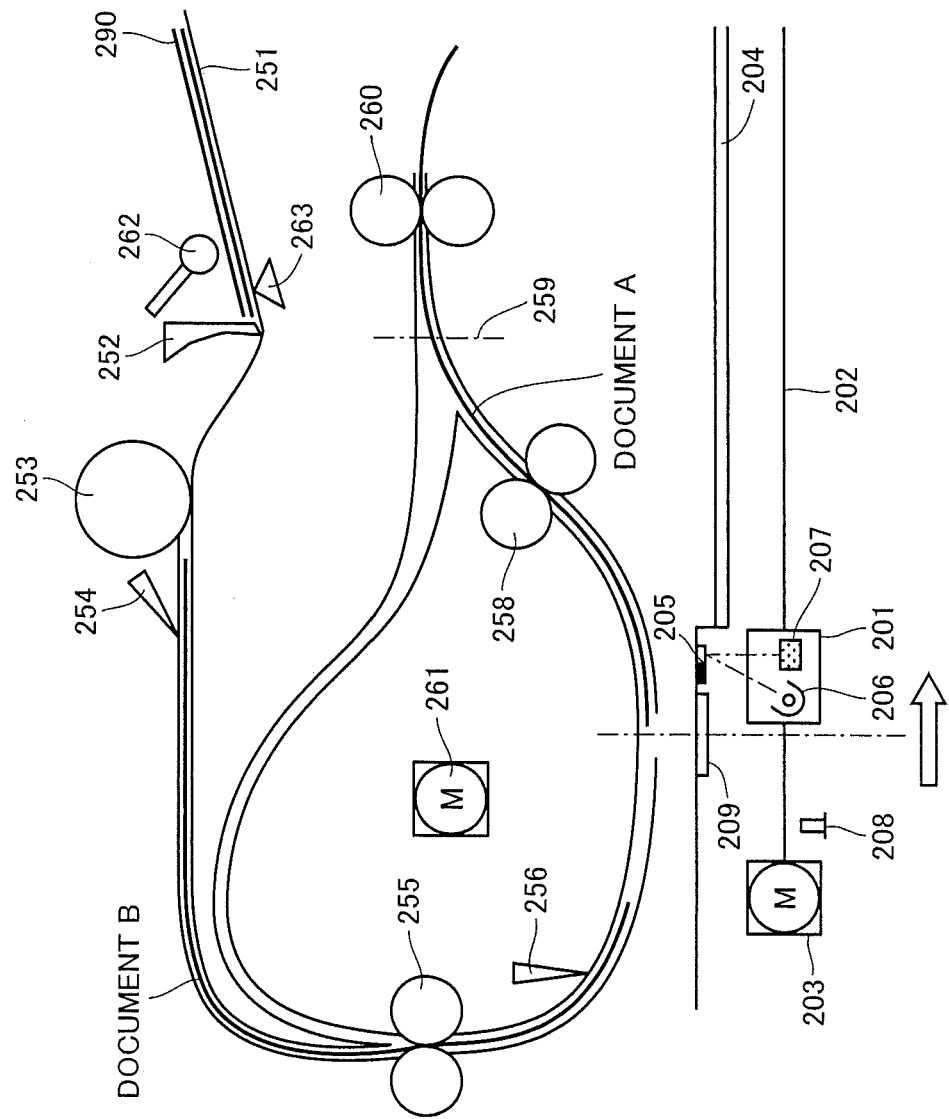
FIG. 5 illustrates a scanner operation (shading execution) at a time of interruptive shading in accordance with an embodiment of the present invention.

The interruptive shading will be described with reference to FIG. 4 and FIG. 5. FIG. 4 and FIG. 5 show the configuration in FIG. 2, partially omitted. The thick solid lines in the figures indicate documents 290. When a plurality of documents 290 are successively conveyed one by one by ADF unit 250, documents 290 are supplied in succession at ADF reading position 257 of IR unit 200, so that an image is read for each of the supplied documents 290.

Here, it is assumed that it is detected that execution of interruptive shading is necessary during the course of conveyance of document A and document B, in ADF unit 250. In this case, as shown in FIG. 4, first, control device 311 controls ADF motor 261 at a point of time when reading of the image of document A is ended. This control allows ADF motor 261 to slow down and stop. At this point, IR module 201 is still located immediately below ADF reading position 257. Thereafter, as shown in FIG. 5, control device 311 drives IR motor 203. Accordingly, IR module 201 starts moving in the arrow direction in the figure, moves to the position immediately below shading plate 205, and then stops. Thereafter, image data of shading plate 205 is detected by image sensor 207, and the detected image data is applied to control device 311.

In response to an execution instruction from timing control portion 325, correction coefficient detection portion 328 of shading correction portion 323 of control device 311 calculates a correction coefficient 329 required for shading correction, based on the detected image data (the image data detected from shading plate 205), and stores the calculated correction coefficient 329 in RAM 321. Accordingly, the interruptive shading process which started in response to input of an execution instruction is ended.

Control device 311 thereafter drives IR motor 203. Accordingly, IR module 201 starts moving, moves to the position immediately below ADF reading position 257 shown by FIG. 4, again, and then stops there. Then, control device 311 drives the stopping ADF motor 261. Accordingly, document B is conveyed to the location of ADF reading position 257 so that an image of document B is read. Shading correction portion 323 performs shading correction processing on the read image of document B, based on correction coefficient 329 read from RAM 321.

[Shading Correction Process]

The shading correction process refers to a process of compensating for unevenness of image density when document 290 with uniform image density is read. This is to correct unevenness of image density caused by orientation variations of lamp 206 or variations in pixel sensitivity of a CCD (Charge Coupled Device) line sensor in image sensor 207. Specifically, based on the image data detected by the CCD line sensor receiving light, which is applied from lamp 206 and then reflected at a white plate portion of shading plate 205, correction coefficient 329 for use in shading correction is calculated and stored in RAM 321. After that, shading correction is performed on the image data read from document 290 and then digitally converted, using correction coefficient 329 read from RAM 321 by shading correction portion 323. The shading correction on image data may use a known technique.

The method of shading correction is not limited to correction of image data. For example, an output voltage level corresponding to the quantity of received light may be changed by variably controlling the reference gain of the CCD line sensor serving as a light-receiving element using the shading correction coefficient.

[Print Operation]

Image forming unit 306 prints image data output from the image processing unit on a recording sheet. More specifically, an image to be printed is formed from image data, and the formed image is printed on a recording sheet in accordance with manner specification information 330 which specifies the manner of arrangement of an image of document 290 in printing.

Here, it is assumed that the user operates operation unit 11 to input manner specification information 330 together with an instruction to start a copy operation. The input manner specification information 330 is stored in RAM 321. Therefore, the subsequent copy operation is controlled in accordance with manner specification operation 330 read from RAM 321.

[Manner of Arrangement of Document in Printing]

The manner of arrangement of the image read from document 290 on a recording sheet in printing will be described. For example, when manner specification information 330 designates duplex copy output in which images are printed on both sides of a recording sheet, image forming unit 306 prints image data output from image processing portion 327 in the manner shown in FIG. 6A-FIG. 6C. As shown in the figures, images are printed on both sides (the front side that is one side, and the back side that is the other side) of each of three recording sheets.

FIG. 6D-FIG. 6F show the state in which the recording sheets after printing in FIG. 6A-FIG. 6C are edited in a booklet form. In the booklet, the image on the first recording sheet and the image on the second recording sheet are images on the spread pages (see FIG. 6E), and the image on the second recording sheet and the image on the third recording sheet are images on the spread pages (see FIG. 6F).

FIG. 7A-FIG. 7C show an example of print output in a case where manner specification information 330 designates Page Layout Function. Page Layout Function refers to a function of arranging N (N is an integer of one or more) pieces of image data on one side of one recording sheet. This is the so-called "N in 1" manner.

For example, when manner specification information 330 designates "2 in 1," as shown in FIG. 7A-FIG. 7C, two images are printed on one recording sheet. FIG. 7D-FIG. 7F show the state in which the recording sheets after printing in FIG. 7A-FIG. 7C are edited in a booklet form. In the booklet, the image on the second recording sheet and the image on the third recording sheet are images on the spread pages (see FIG. 7E), and the image on the fourth recording sheet and the image on the fifth recording sheet are images on the spread pages (see FIG. 7F).

[Detection of Basic Timing of Executing Interruptive Shading]

The basic timing of executing interruptive shading is preset (detected) based on the characteristics of lamp 206 in use, as described below.

Figures 8, 9:
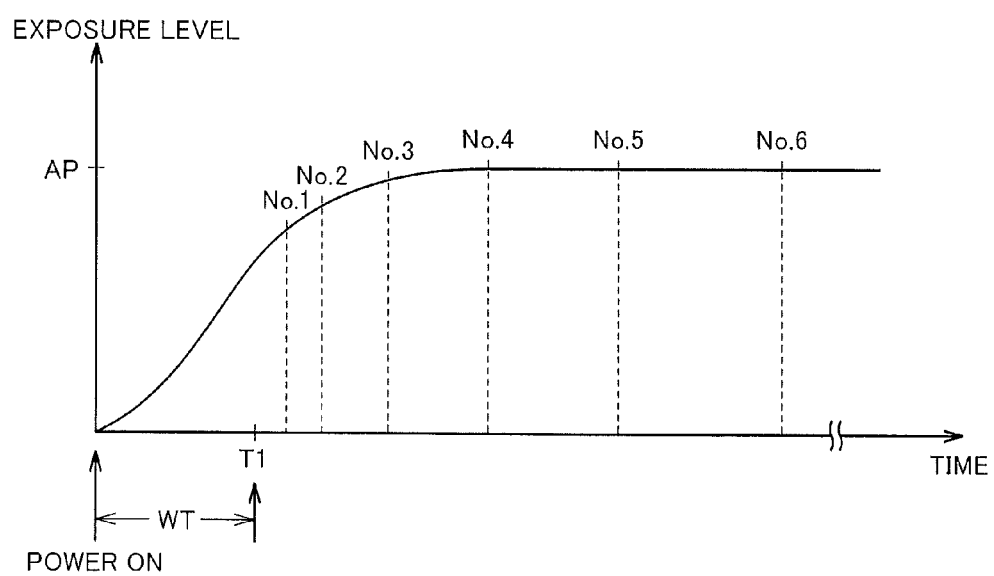
FIG. 8 shows a table that is referred to for determining an execution timing of interruptive shading in accordance with an embodiment of the present invention.
FIG. 9 is a diagram for illustrating an execution timing of interruptive shading based on the table in FIG. 8.

FIG. 8 shows contents of a table TB stored beforehand in nonvolatile memory 312. FIG. 9 schematically shows the relation between the elapsed time since power-on of AIO 1 and the exposure level of lamp 206 as well as the timings of executing the shading interruption in connection with the above-noted relation.

In table TB of nonvolatile memory 312, data TB1 and TB2 are stored beforehand in association with each interruptive shading. Data TB1 represents an interruption No. indicating the corresponding interruptive shading. Data TB2 represents the time (seconds) at which the corresponding interruptive shading is to be executed, that is, an interval. The interval at which interruptive shading is to be executed is designated by data TB2. Here, the interval at which interruptive shading is executed as designated by data TB2 is referred to as the basic interval.

Referring to FIG. 9, the exposure level of lamp 206 changing over time will be described. In FIG. 9, the vertical axis indicates the exposure level, and the horizontal axis indicates the elapsed time. Referring to FIG. 9, when AIO 1 is powered on, current starts being supplied to lamp 206 thereby turning on lamp 206. At time T1 when a prescribed time WT has elapsed since power-on, the warm up of AIO 1 is completed. Upon completion of warm up, control device 311 is ready for accepting a copy (print) start instruction signal input by the user through operation unit 11. Therefore, after time T1, ADF unit 250 conveys document 290, and IR unit 200 reads an image of the conveyed document 290. Therefore, during prescribed time WT after power-on, delivery of document 290 and image reading cannot be carried out. It is noted that prescribed time WT is predetermined depending on the model of AIO 1, and the determined prescribed time WT is stored in nonvolatile memory 312. Prescribed time WT may be changed in accordance with an external input.

After power-on, the quantity of light of lamp 206 increases, and the exposure level rises accordingly. The exposure level reaches the optimum level AP within a relatively short period from time T1. The optimum level AP refers to the exposure level that enables image data to be printed on a recording sheet to have a prescribed density that is adequate enough.

In the present embodiment, the interval at which interruptive shading is executed is changed depending on the length of the elapsed time from completion of warm-up. More specifically, as shown in FIG. 8 and FIG. 9, when 10 seconds have elapsed after completion of warm-up, first interruptive shading is executed. When 20 seconds have elapsed after completion of warm-up, second interruptive shading is executed. After that, third interruptive shading after a lapse of 40 seconds, fourth interruptive shading after a lapse of 70 seconds, fifth interruptive shading after a lapse of 110 seconds, and sixth interruptive shading after a lapse of 160 seconds are each executed similarly.

In this manner, in the period from time T1 at completion of warm-up until the quantity of light of lamp 206 reaches the quantity of light corresponding to the exposure optimum level AP, the interval of executing interruptive shading is short, and the interval is shorter immediately after time T1. Then, in the period during which the quantity of light of lamp 206 reaches the quantity of light corresponding to the exposure optimum level AP and then indicates the optimum level AP or higher, the interval of executing interruptive shading becomes longer, and the interval is longer as the elapsed time from time T1 is longer.

Therefore, when the changing degree of the quantity of light of lamp 206 is great, and the value of correction coefficient 329 necessary for performing accurate shading correction thus changes greatly, the interval of executing interruptive shading is reduced, thereby allowing accurate shading correction. When the quantity of light of lamp 206 equivalent to the optimum level AP is obtained, the value of correction coefficient 329 necessary for performing accurate shading correction does not change greatly, and therefore the interval of executing interruptive shading is increased. Accordingly, the time period during which the conveyance of document 290 is temporarily stopped because of interruptive shading is reduced, thereby reducing the time required for copying (printing).

In the present embodiment, a plurality of tables TB associated with environmental information indicating the surrounding environmental conditions in which AIO 1 is installed are stored beforehand in nonvolatile memory 312. Tables TB to be referred to are switched depending on the conditions of the environment in which AIO 1 is installed. Here, the environmental condition is set as the ambient temperature of AIO 1. This is because it is known that the characteristics of lamp 206 depend on the ambient temperature. AIO 1 includes a temperature sensor (not shown) which measures the temperature of the room in which AIO 1 is installed. The ambient temperature measured by the temperature sensor is read (detected) by temperature detection unit 332, and the read ambient temperature is applied to correction execution control portion 324. At a time of power-on, correction execution control portion 324 selects table TB associated with the ambient temperature from among a plurality of tables TB in nonvolatile memory 312, based on the ambient temperature input from temperature detection unit 332. After that, timing control portion 325 refers to the selected table TB to control the interval of executing interruptive shading.

[Change of Timing of Executing Interruptive Shading]

The timing of executing interruptive shading as determined in accordance with the characteristics of lamp 206 is determined depending on the basic interval in accordance with table TB in FIG. 8. The basic interval is changed in accordance with the aforementioned manner specification information 330.

In the case where the recording sheets having both sides printed as shown in FIG. 6A-FIG. 6C are stitched at one side and edited in a booklet form, "the second page" and "the third page", "the fourth page" and "the fifth page", . . . , "the 2n-th page" and "the (2n+1)th page" (n=1, 2, 3, . . . ) are each on a spread in a state in which the booklet is open, as shown in FIG. 6D-FIG. 6F. In this manner, when the user views the booklet, a density difference or color tone difference between images visually facing on a spread is conspicuous, if any. Furthermore, images may have a density difference or color tone difference between before and after execution of shading correction. Therefore, it is desirable not to execute shading correction between readings of images to be arranged on a spread.

Therefore, in the present embodiment, the basic interval of executing interruptive shading is determined based on table TB, and the determined basic interval is changed based on manner specification information 330, thereby avoiding execution of interruptive shading between readings of images to be arranged on a spread.

[Copy Operation of Single-Side Printing]

An operation in a case where a manner of arranging an image read from one side of document 290 on a single side (one side) of a recording sheet is specified by manner specification information 330 will be described. In this case, interruptive shading may be executed in accordance with the timing based on the basic interval defined in table TB shown in FIG. 8.

Figure 10:
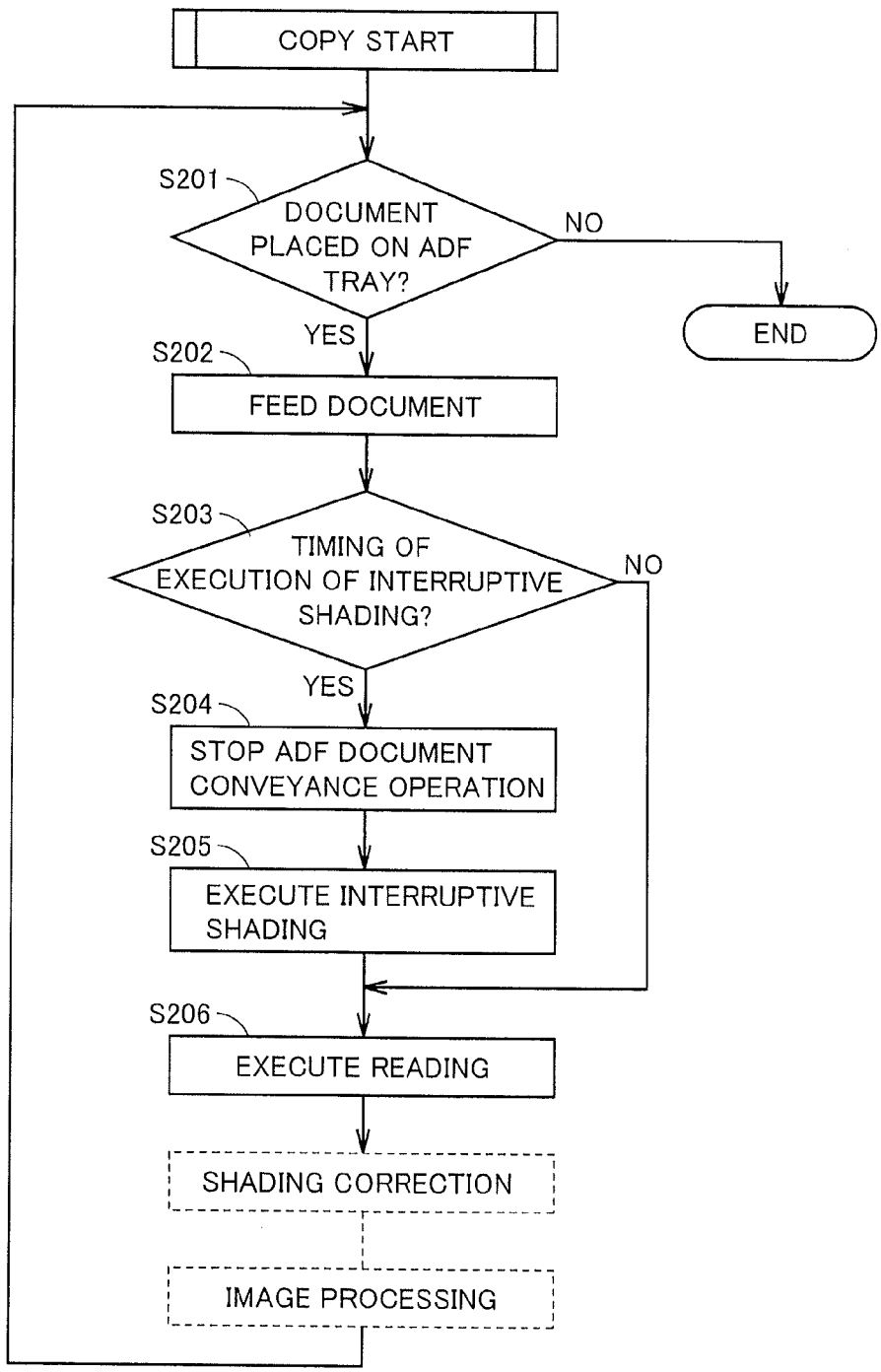
FIG. 10 is an exemplary flowchart at a time of ADF reading in accordance with an embodiment of the present invention.

Referring to FIG. 10, upon start of ADF copy, control device 311 determines whether document 290 is placed on document tray 251 or not, based on a detection signal of document detection sensor 263 (S201). If it is determined that no document is placed (NO in S201), copy is cancelled, or the operation is switched to image reading by a not-shown flatbed.

If it is determined that document 290 is placed (YES in S201), document 290 is fed and conveyed from document tray 251 to the inside of ADF unit 250 (S202). Then, the elapsed time from completion of warm-up (time T1) is detected. The elapsed time is measured by timer 331. Timing control portion 325 searches table TB in nonvolatile memory 312 based on the detected elapsed time. If it is determined that data TB2 representing the above-noted elapsed time is not detected based on the search result (NO in S203), the process proceeds to S206 described later.

On the other hand, if it is determined that data TB2 representing the above-noted elapsed time is detected (YES in S203), it is determined that the present timing of reading the image of document 290 is the timing at which interruptive shading is to be executed (YES in S203). Then, control device 311 temporarily stops the conveyance of document 290 by ADF unit 250 (S204) and allows image sensor 207 to move immediately below shading plate 205 for image reading. Correction coefficient detection portion 328 calculates correction coefficient 329 based on the read image data and stores the calculated correction coefficient 329 into nonvolatile memory 312 (S205).

Upon completion of interruptive shading, the suspended conveyance of document 290 by ADF unit 250 and image reading by IR unit 200 is resumed (S206). The process thereafter returns to S201.

The read image data in S206 is subjected to shading correction based on correction coefficient 329 read from nonvolatile memory 312 by shading correction portion 323, concurrently with conveyance and image reading of the next document 290. The image data is thereafter processed in image processing portion 327 and then output to image forming unit 306.

[Copy Operation of Double-Side Printing]

If the execution timing of interruptive shading is simply determined only with the basic interval designated by data TB2 of table TB, when double-side printing is designated, interruptive shading may be executed between image reading of "the 2n-th page" and image reading of "the (2n+1)th page" of the booklet edited using the printed recording sheets. If it is executed, the user views the booklet to find a density difference or color tone difference in images visually facing on a spread. Then, as shown in FIG. 11, control is performed such that interruptive shading is not executed between these image readings.

Figure 11:
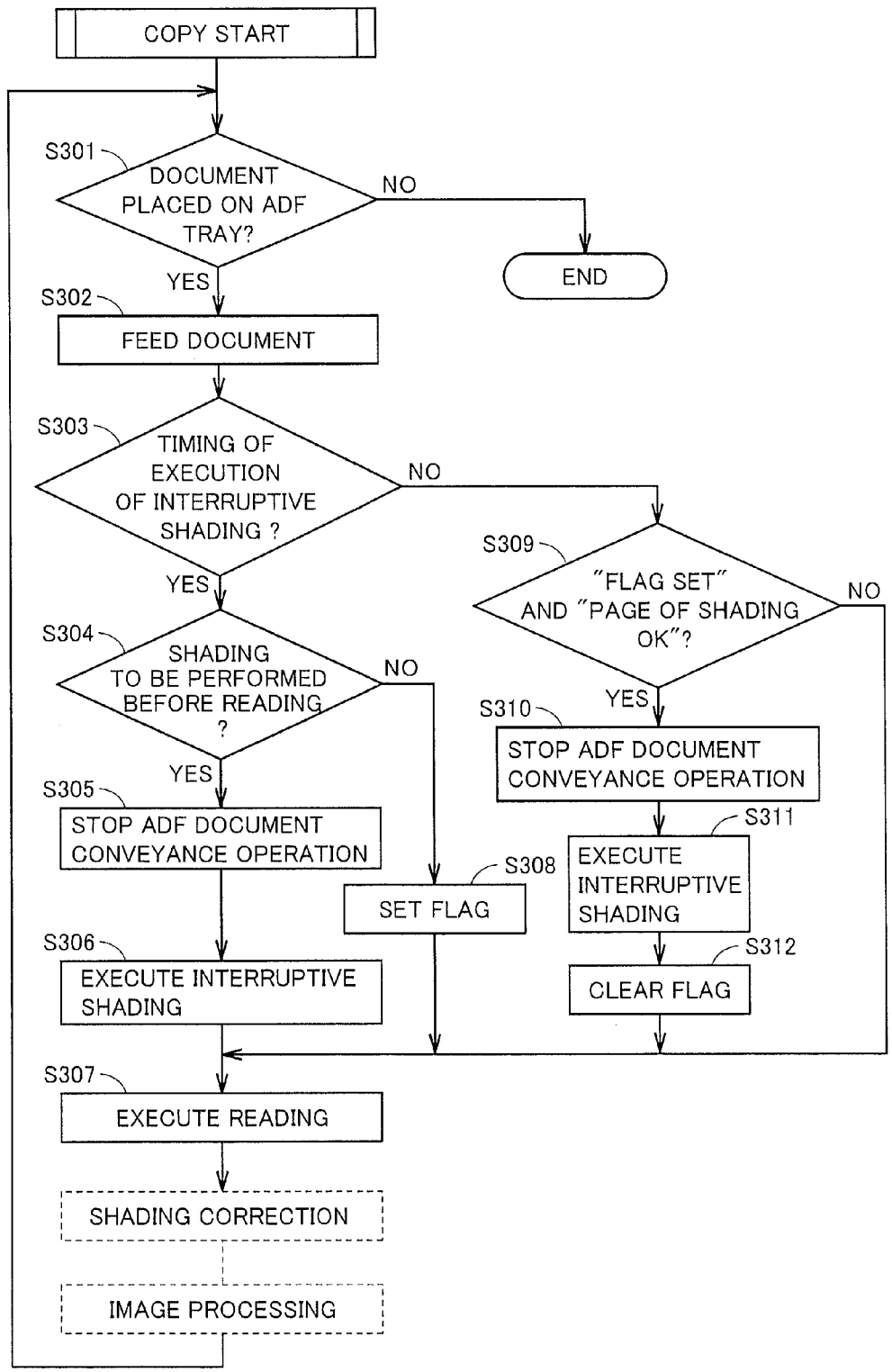
FIG. 11 is another exemplary flowchart at a time of ADF reading in accordance with an embodiment of the present invention.

Referring to FIG. 11, the similar processing in S201, S202, S203 in FIG. 10 as described above is performed (S301, S302, S303).

Here, if it is determined that the present timing of image reading of document 290 agrees with the timing of executing interruptive shading, based on the search result of table TB (YES in S303), timing control portion 325 determines whether interruptive shading is to be executed or not before reading the next image (S304). In other words, if it is detected that arrangement of images by double-side printing is designated based on manner specification information 330, it is determined whether the image to be read this time is the image to be arranged on the 2n-th page of the booklet or not. Specifically, CPU 320 has a not-shown counter and counts the images read by image reading unit 305 using the counter, so that it can be determined whether the image to be read this time (the image that is about to be read) is the image to be arranged on the 2n-th page, based on the count value.

If it is determined that the image is the image to be arranged on the 2n-th page, that is, if it is determined that the present timing is the timing at which execution of interruptive shading is acceptable (YES in S304), the conveyance of document 290 by ADF unit 250 is temporarily stopped, similarly to the aforementioned S204, S205, and S206 (S305). Then, after image sensor 207 moves immediately below shading plate 205, interruptive shading is executed (S306). Upon completion of execution of interruptive shading, the suspended conveyance of document 290 by ADF unit 250 and image reading by IR Unit 200 is resumed (S307).

If it is determined that the image to be read this time is the image to be arranged on the (2n+1)th page, that is, if it is determined that it is the image on the page for which execution of interruptive shading should be avoided (NO in S304), a flag for indicating that execution of interruptive shading should be avoided is set to '1' (S308). Then, without executing interruptive shading, the process proceeds to S307, and reading of documents 290 continues.

Returning to S303, even if it is determined that interruptive shading should not be executed on the image to be read this time, based on the search result of table TB (NO in S303), interruptive shading is executed in the following case. Specifically, if timing control portion 325 determines that the flag for avoiding shading execution is set to '1' and that the image is the image for which execution of interruptive shading is acceptable (in a case of double-side printing, the page on which the present read image is to be arranged is the 2n-th page of the booklet) (YES in S309), ADF unit 250 temporarily stops the conveyance of document 290 (S310), and after image sensor 207 moves immediately below shading plate 205, interruptive shading is executed (S311). Upon completion of interruptive shading processing, the flag for avoiding shading execution is set to '0' (S312), and the conveyance of document 290 by ADF unit 250 and image reading is resumed (S307).

Even if the flag for avoiding shading execution is set to '1,' if timing control portion 325 determines that the present image is the image for which interruptive shading should be avoided (in a case of double-side printing, the page on which the present read image is to be arranged is the (2n+1)th page of the booklet) (NO in S309), the process proceeds to S307 without executing interruptive shading.

It is noted that the flag for avoiding shading execution is set to '0' at the start or the end of a series of copy operations.

In this manner, the interruptive shading, which has been postponed because the image to be read is the image for which execution of interruptive shading should be avoided, can be executed at a point of time when it is detected that the image to be read later is the image for which execution of interruptive shading is acceptable. Accordingly, although the timing of executing interruptive shading is shifted from the timing in accordance with the basic interval specified by table TB, the speed of conveyance of documents 290 and the image reading speed are fast, and therefore interruptive shading can be executed substantially in accordance with the timing defined in table TB.

In the processing in FIG. 11, the read image data in S307 is also subjected to shading correction based on correction coefficient 329 in nonvolatile memory 312 by shading correction portion 323, concurrently with conveyance and image reading of the next document 290. The image data that has been subjected to shading correction is processed in image processing portion 327 and then output to image forming unit 306.

[Copy Operation of Page Layout Printing]

In FIG. 11, double-side printing is designated by manner specification information 330. Also in the case where Page Layout Function ("2 in 1") is specified by manner specification information 330 as shown in FIG. 7A-FIG. 7C, the timing at which interruptive shading is to be executed is determined in accordance with the process in FIG. 11, and interruptive shading may be executed at the determined timing. Specifically, in the case of "2 in 1," the pairs of images to be arranged each on the same page of a recording sheet as a print result are a pair of "the first read image" and "the second read image," a pair of "the third read image" and "the fourth read image," and a pair of "the (2n−1)th read image" and "the 2n-th read image" (n=1, 2, 3, . . . ) after the start of copy operation. In this case, the timing at which execution of interruptive shading should be avoided is before the start of reading "the 2n-th image." In accordance with this condition, timing control portion 325 can determine the timing at which interruptive shading is to be executed, according to the aforementioned flow shown in FIG. 11. Then, interruptive shading can be executed in accordance with the determined timing.

[Copy Operation of Double-Side Printing and Page Layout Printing]

In a case where "double-side printing" and "Page Layout" are designated at the same time by manner specification information 330, the output result is as shown in FIG. 7D-FIG. 7F. In this case, the number of read images for which execution of interruptive shading should be avoided is increased as compared with the above-noted printing methods. Therefore, it is rather preferable to detect the read image for which interruptive shading can be executed. More specifically, in the example shown in FIG. 7A-FIG. 7F, the timings at which interruptive shading can be executed are "before reading the third image," "before reading the seventh image," "before reading the eleventh image," . . . "before reading the (4n−1)th image" (n=1, 2, 3, . . . ).

In this manner, in the case where manner specification information 330 is set to designate a combination of multiple functions, and the images for which execution of shading correction should be avoided are thus increased, timing control portion 325 refers to the basic interval of interruptive shading execution based on table TB, as an auxiliary condition. In other words, when an image for which interruptive shading can be executed is read, it may be determined, before reading, whether interruptive shading is to be executed or not, based on data TB2 of table TB, and an instruction to execute interruptive shading may be output based on the determination result.

[Other Process Procedure]

Figure 12:
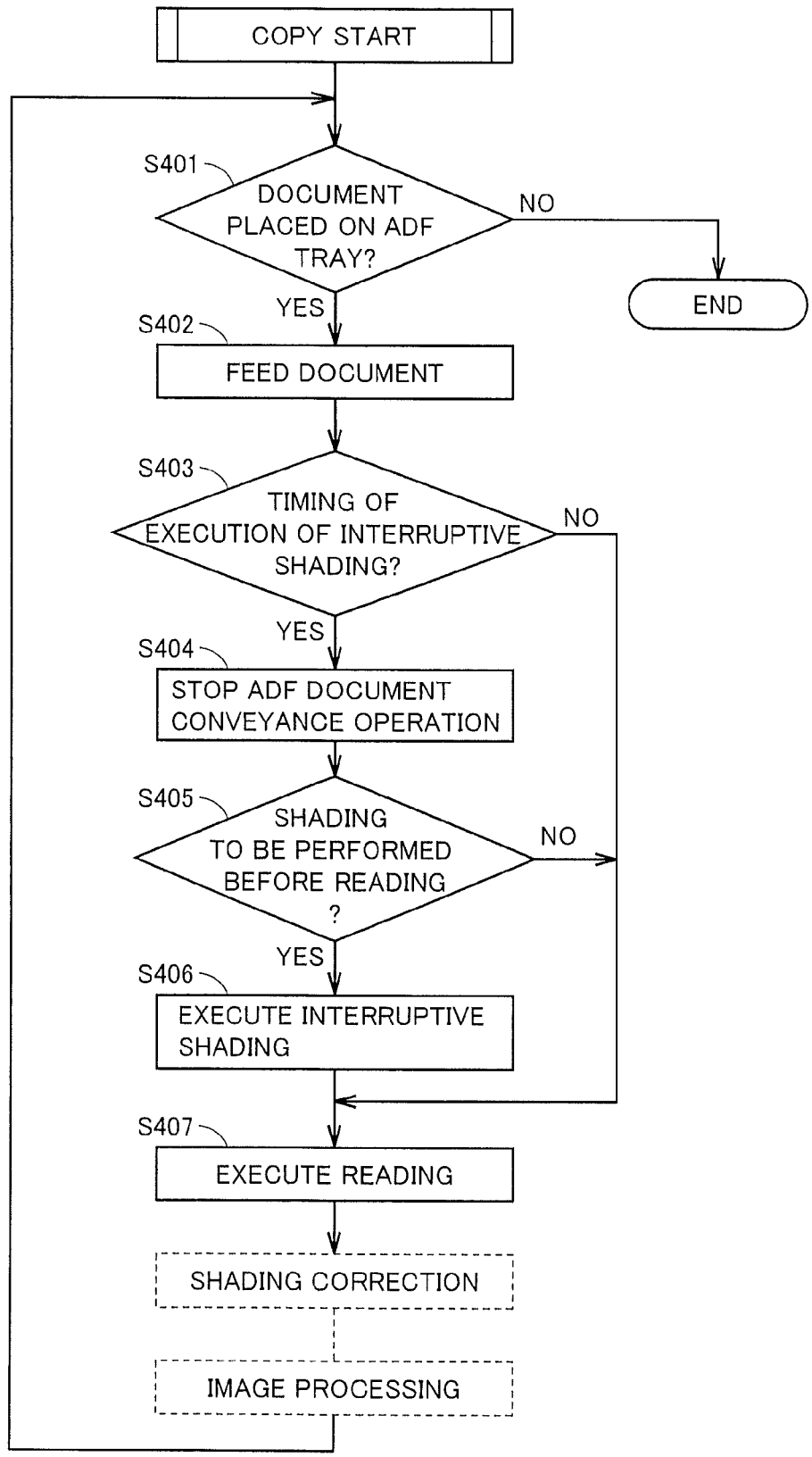
FIG. 12 is yet another exemplary flowchart at a time of ADF reading in accordance with an embodiment of the present invention.

FIG. 12 shows a modified example of the process flowchart in FIG. 10. In FIG. 12, similarly to FIG. 10, timing control portion 325 determines the interval of executing interruptive shading. More specifically, timing control portion 325 detects the basic timing of executing interruptive shading based on table TB (S403). Then, only when it is detected that the present moment is the timing for execution based on the detection result and is the timing of reading an image for which interruptive shading can be executed (execution is acceptable) based on manner specification information 330 (YES in S405), an execution instruction is output to correction coefficient detection portion 328. In response to the execution instruction, correction coefficient detection portion 328 executes interruptive shading (S406). The other processing (S401, S402, S404, S407) in FIG. 12 is similar to the corresponding processing in FIG. 10.

[Still Another Process Procedure]

According to the procedure in FIG. 12, even when the time has come at which interruptive shading is to be executed based on the basic interval specified by data TB2 of table TB, if it is detected that the image to be read is the one for which execution of interruptive shading should be avoided based on manner specification information 330, interruptive shading is not executed. In other words, until the time has come when the next interruptive shading is to be executed based on table TB, interruptive shading is not allowed to be executed.

Therefore, if the number of times of image readings for which execution of interruptive shading is determined to be avoided based on manner specification information 330 is relatively small, interruptive shading can be executed substantially in accordance with the basic interval specified by data TB2 of table TB, even in the procedure in FIG. 12.

On the other hand, if the number of times of image readings for which execution of interruptive shading is determined to be avoided is large, it is substantially difficult to execute interruptive shading in accordance with the timing of table TB, under the procedure in FIG. 12. In order to solve this, the process procedure in FIG. 13 is applied.

Figure 13:
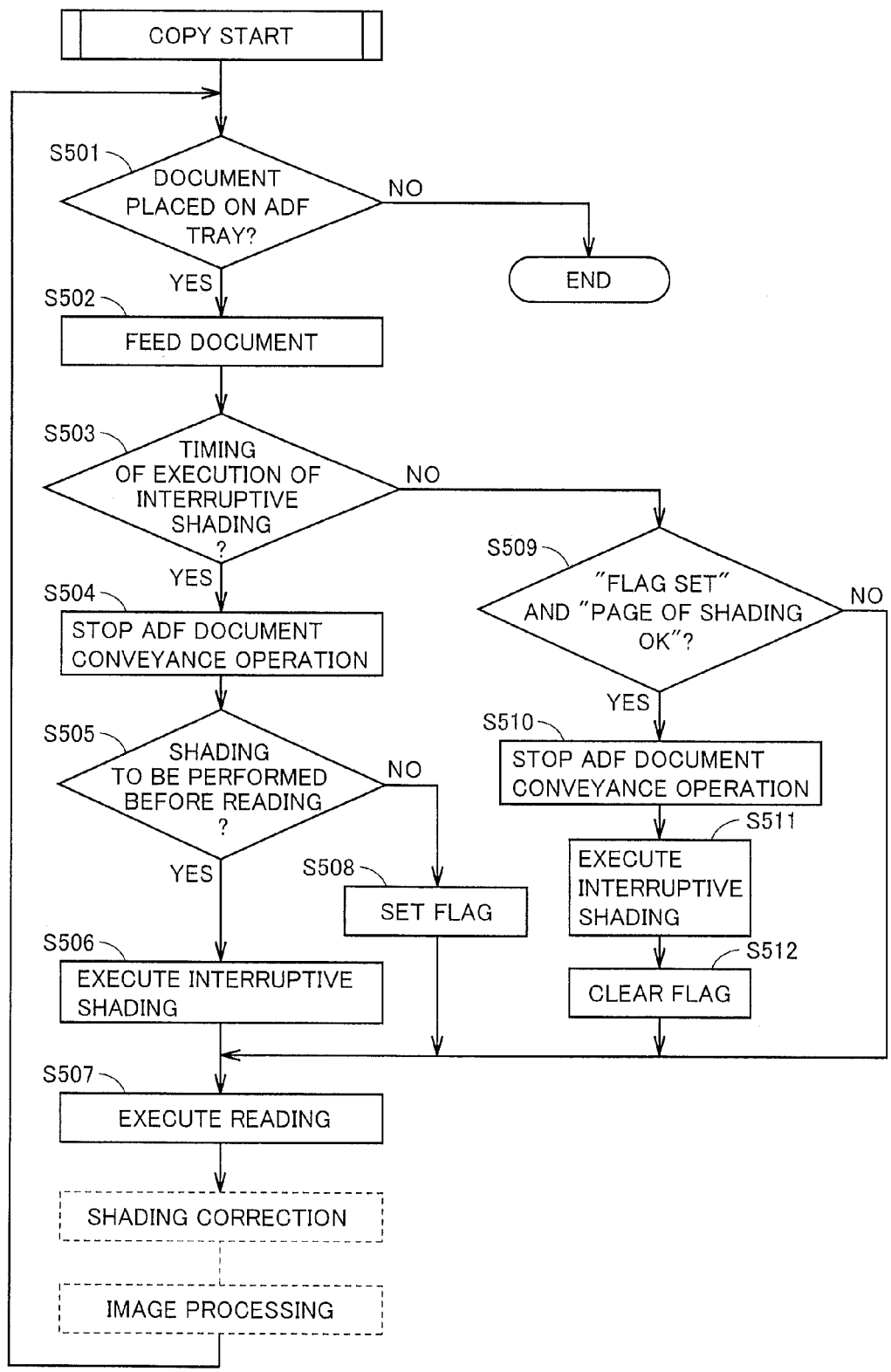
FIG. 13 is yet another exemplary flowchart at a time of ADF reading in accordance with an embodiment of the present invention.

FIG. 13 shows a modified example of the process flowchart in FIG. 11. In FIG. 13, similarly to the procedure shown in FIG. 11, even when execution of interruptive shading is avoided based on manner specification information 330, if an image for which interruptive shading can be executed is detected immediately afterward, interruptive shading is executed. Accordingly, interruptive shading can be executed substantially in accordance with the basic interval specified by data TB2 of table TB.

The processing in S501-S512 in FIG. 13 is similarly to the processing in S301-S312 in FIG. 11, and therefore a description thereof will not be repeated.

In comparison between FIG. 11 and FIG. 13, in FIG. 11, after the determination (S304) as to whether execution of interruptive shading should be avoided or not based on manner specification information 330, the operation of conveying document 290 by ADF unit 250 is stopped (S305), By contrast, in FIG. 13, before the determination (S505) as to whether execution of interruptive shading should be avoided or not based on manner specification information 330, the operation of conveying document 290 by ADF unit 250 is stopped (S504).

It takes relatively long time to stop the conveyance of document 290 by ADF unit 250 and resume the conveyance later, because it is necessary to resume the rotational operation of motor 261 and resume rotation of each roller through a gear mechanism or the like in connection with the rotation of motor 261. Therefore, in the case where manner specification information 330 is set to specify such an image arrangement manner in that the determination as to whether execution of interruptive shading should be avoided or not is frequently required, the procedure in FIG. 13 may be employed. By contrast, in the case where manner specification information 330 is set to specify such an image arrangement manner in that the above-noted determination is not frequently required, the procedure in FIG. 11 is preferable to that in FIG. 13. In this manner, CPU 320 of control device 311 may selectively switch between the procedures in FIG. 11 and FIG. 13, based on manner specification information 330, when an instruction to start copy (printing) is given.

In accordance with the foregoing embodiment, the interval at which a new correction coefficient for shading correction is detected is determined in accordance with the manner of arrangement of images on output paper and the characteristics of lamp 206. Therefore, it becomes possible to perform shading correction with the same correction coefficient applied to the images arranged on the same sheet of output paper, irrespective of the arrangement manner. As a result, it is possible to prevent a density difference and a color difference between the images.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
an image reader unit for outputting image data of a plurality of document pages supplied through a conveyance path, said image reader unit including,
a light source for emitting, and
a photoelectric converter having pixels for receiving reflected light and performing photoelectric conversion of the reflected light, wherein said image reader unit obtains said image data by applying the light from said light source to said document and performing photoelectric conversion of the reflected light from said document; and
a controller configured to
i) execute a detection operation of calculating a correction coefficient based on reference image data obtained by applying the light from said light source to a predetermined reference unit and receiving, by said photoelectric conversion unit, the reflected light from said predetermined reference unit to perform photoelectric conversion of the received light to said reference image data,
ii) correct image density variations of said image data caused by orientation variations of said light source and pixel sensitivity of said photoelectric conversion unit based on said correction coefficient,
iii) form an output image to be printed on output paper in accordance with a prescribed manner in which images of a plurality of pages are to be arranged on said output paper, based on said corrected image data, and
iv) determine an interval at which said detection operation avoids execution between readings of images of individual pages of said plurality of pages to be arranged on one sheet of said output paper in accordance with said prescribed manner.

2. The image forming apparatus according to claim 1, wherein said interval is further determined in accordance with a characteristic of said light source comprising a relation between an elapsed time since the quantity of emission light from said light source reaches a level that allows image reading upon start of power supply to said image forming apparatus, and an exposure level depending on said quantity of emission light.

3. The image forming apparatus according to claim 1, wherein said prescribed manner includes an N in 1 manner that designates N pieces of said image data, wherein N is an integer of one or more, to be arranged on a plane of one sheet of said output paper.

4. The image forming apparatus according to claim 1, wherein said prescribed manner includes a double-side manner that designates said image data to be arranged on each of both sides of said output paper.

5. The image forming apparatus according to claim 1, wherein said prescribed manner includes a combination of an N in 1 manner that designates N pieces of said image data, wherein N is an integer of one or more, to be arranged on a plane of one sheet of said output paper and a double-side manner that designates said image data to be arranged on each of both sides of said output paper.

6. The image forming apparatus according to claim 1, wherein
said controller further determines said interval by changing a prescribed interval in accordance with said prescribed manner, and
said prescribed interval is determined in advance based on a characteristic of said light source.

7. The image forming apparatus according to claim 6, wherein said prescribed interval is changed based on an environmental condition in which said image forming apparatus is installed.

8. The image forming apparatus according to claim 6, wherein said controller determines said interval within a period during which said prescribed interval is designated.

9. The image forming apparatus according to claim 8, wherein said prescribed interval is changed based on an environmental condition in which said image forming apparatus is installed.

10. An image forming method comprising the steps of:
applying light from a light source to a supplied document, receiving reflected light from said document, performing photoelectric conversion of the received light to read image data of said document, and outputting the read image data;
applying light from said light source to a reference unit prepared beforehand, receiving reflected light from said reference unit, performing photoelectric conversion of the received light to read reference image data, and executing a detection operation of calculating a correction coefficient based on read said reference image data;
correcting image density variations of said image data caused by orientation variations of said light source and pixel sensitivity of said photoelectric conversion based on said correction coefficient;
forming an output image to be printed on output paper in accordance with a prescribed manner in which images of a plurality of pages are to be arranged on said output paper, based on said corrected image data; and
determining an interval at which said detection operation, in accordance with said prescribed arrangement manner, avoids execution of said detection operation between readings of images of individual pages of said plurality of pages to be arranged on one sheet of said output paper in accordance with said prescribed manner.

11. The image forming method according to claim 10, wherein said interval is further determined in accordance with a characteristic of said light source comprising a relation between an elapsed time since the quantity of emission light from said light source reaches a level that allows image reading upon start of power supply to said image forming apparatus, and an exposure level depending on said quantity of emission light.

* * * * *